United States Patent
Lee et al.

(10) Patent No.: US 10,168,169 B2
(45) Date of Patent: Jan. 1, 2019

(54) SYSTEM AND METHOD FOR CALCULATING DTE WHEN SETTING PATH OF NAVIGATION

(71) Applicant: Hyundai Motor Company, Seoul (KR)

(72) Inventors: Jin Hyung Lee, Seoul (KR); Sang Woo Lee, Seoul (KR); Yong Seok Park, Gyeongi-do (KR)

(73) Assignee: Hyundai Motor Company, Seoul (KR)

( * ) Notice: Subject to any disclaimer, the term of this patent is extended or adjusted under 35 U.S.C. 154(b) by 112 days.

(21) Appl. No.: 15/364,477

(22) Filed: Nov. 30, 2016

(65) Prior Publication Data
US 2018/0031380 A1    Feb. 1, 2018

(30) Foreign Application Priority Data
Jul. 29, 2016    (KR) ........................ 10-2016-0096709

(51) Int. Cl.
    *G01C 21/36*    (2006.01)
    *G01C 21/34*    (2006.01)

(52) U.S. Cl.
    CPC ..... *G01C 21/3469* (2013.01); *G01C 21/3697* (2013.01)

(58) Field of Classification Search
    CPC .................................................. G01C 21/3697
    See application file for complete search history.

(56) References Cited

U.S. PATENT DOCUMENTS

| | | | | |
|---|---|---|---|---|
| 2012/0116670 A1* | 5/2012 | Rosekrans | ......... | G01C 21/3469 701/426 |
| 2012/0179420 A1* | 7/2012 | Gilman | .................. | B60K 35/00 702/165 |
| 2013/0073113 A1* | 3/2013 | Wang | ..................... | B60K 6/445 701/1 |

(Continued)

FOREIGN PATENT DOCUMENTS

| | | |
|---|---|---|
| JP | H 09297034 A | 11/1997 |
| JP | 2007-094703 A | 4/2007 |
| JP | 2012-242329 A | 12/2012 |

(Continued)

OTHER PUBLICATIONS

Notice of Allowance dated Jul. 19, 2018 in corresponding Korean Application No. KR 10-2016-0096709.

*Primary Examiner* — Anshul Sood
(74) *Attorney, Agent, or Firm* — Mintz Levin Cohn Ferris Glovsky and Popeo, P.C.; Peter F. Corless (57) ABSTRACT

A method for calculating a distance to empty (DTE) when setting a path of navigation is provided. The method includes receiving path search cases from a navigation and determining whether the transmitted path search case is a path cancellation, a vehicle arriving at a destination, or the navigation searching for the path. The method determines whether the transmitted path search case is an initially set path or a reset path. When the transmitted path search case is none of the above the method determines whether there is a currently guided. When the path is initially set, the path is reset after, or the path is currently being guided, among the (Continued)

path search cases, a path reflected DTE is displayed through the navigation; and the path reflected DTE is calculated in real time and path reflected prediction fuel efficiency is calculated, after displaying the path reflected DTE.

16 Claims, 4 Drawing Sheets

(56) References Cited

U.S. PATENT DOCUMENTS

| | | | | |
|---|---|---|---|---|
| 2015/0369619 | A1* | 12/2015 | Kim | G01C 21/3469 |
| | | | | 701/22 |
| 2016/0061610 | A1* | 3/2016 | Meyer | G01C 21/26 |
| | | | | 701/22 |

FOREIGN PATENT DOCUMENTS

| | | |
|---|---|---|
| JP | 2014-202643 A | 10/2014 |
| KR | 10-0979745 B1 | 9/2010 |
| KR | 2013-0021979 A | 3/2013 |
| KR | 10-2013-0051132 A | 5/2013 |
| KR | 2014-0095780 A | 8/2014 |

* cited by examiner

| SEARCH CASE | 1 | 2 | 3 | 4 | 5 | 6 | 7 | 8 | 9 |
|---|---|---|---|---|---|---|---|---|---|
| | INITIAL PATH SETTING | USER RESET AFTER SETTING PATH | | | | USER CANCELS PATH | ARRIVE AT DESTINATION | START ON AFTER STARTING OFF | DURING PATH SEARCH |
| | | CHANGE DESTINATION | ADD STOP | CHANGE SEARCH OPTION & DETOUR | AVN AUTONOMOUSLY RE-SEARCH (NO CHANGE DESTINATION), STOP SEARCH WITH H/K DURING DETOUR SEARCH | | | | |
| DTE | CHANGE BY REFLECTING PATH INFORMATION | CHANGE BY REFLECTING PATH INFORMATION | CHANGE BY REFLECTING PATH INFORMATION | CHANGE BY REFLECTING PATH INFORMATION | CHANGE BY REFLECTING PATH INFORMATION | RETURN TO LEARNING DTE | RETURN TO LEARNING DTE | MAINTAIN DTE BEFORE STARTING OFF | MAINTAIN PREVIOUS STATE (PATH OR LEARNING) |
| WHETHER TO DISPLAY DURING REFLECTION OF PATH | DISPLAY | DISPLAY | DISPLAY | DISPLAY | DISPLAY | NO | NO | NO | NO |
| NAVIGATION INDEX | 1 | 2 | 3 | 4 | 5 | 6 | 7 | 8 | 9 |
| TRANSMIT ACTUAL EVENT | ① DURING PATH SEARCH (INDEX9) ② INDEX1 +PATH INFORMATION | ① DURING PATH SEARCH (INDEX9) ② INDEX2 +PATH INFORMATION | ① DURING PATH SEARCH (INDEX9) ② INDEX3 +PATH INFORMATION | ① DURING PATH SEARCH (INDEX9) ② INDEX4 +PATH INFORMATION | ① DURING PATH SEARCH (INDEX9) ② INDEX5 +PATH INFORMATION | ① PATH CANCELLATION (INDEX6) | ① ARRIVE AT DESTINATION (INDEX7) | START ON AFTER STARTING OFF (INDEX8) | — |
| PATH INFORMATION | TRANSMIT SET PATH INFORMATION | TRANSMIT SET PATH INFORMATION | TRANSMIT SET PATH INFORMATION | TRANSMIT SET PATH INFORMATION | TRANSMIT SET PATH INFORMATION | PATH INFORMATION 0 | PATH INFORMATION 0 | PATH INFORMATION 0 | PATH INFORMATION 0 |

FIG. 4

SYSTEM AND METHOD FOR CALCULATING DTE WHEN SETTING PATH OF NAVIGATION

CROSS-REFERENCE TO RELATED APPLICATION

This application is based on and claims the benefit of priority to Korean Patent Application No. 10-2016-0096709, filed on Jul. 29, 2016 in the Korean Intellectual Property Office, the disclosure of which is incorporated herein in its entirety by reference.

TECHNICAL HELD

The present disclosure relates to a system and method for calculating a distance to empty (DTE) when setting a path of navigation, and more particularly, to a technology of re-calculating and displaying a DTE based on a change of a path setting in navigation.

BACKGROUND

Currently, electric vehicles, which are viewed as the future of a vehicle industry, have inadequate charging infrastructure compared to existing gasoline/diesel/hybrid vehicles and thus, electric vehicles are unable to accurately provide a distance to empty (DTE) to a driver based on remaining battery charge during driving of the electric vehicle.

Further, examples of a recently developed method for providing a DTE information to a driver of an electric vehicle include displaying the DTE on a cluster based on remaining charge of the battery, displaying the DTE on an audio video navigation (AVN) system mounted within the vehicle, displaying the DTE by a radius of a circle based on a current location when a navigation is mounted within the vehicle (e.g., displaying by two areas, that is, a maximum area and a minimum area), and the like.

When the electric vehicle displays the DTE based on a consumption amount of the battery by the driving and the remaining quantity of the battery without considering a change of a consumption amount of the battery according to the use of electronic units (e.g., air-conditioner, a heater, a black box, etc.) and a driving condition, since the displayed DTE and a distance that the electric vehicle may actually drive are different from each other, the battery may be discharged at an unexpected time and thus, the vehicle may be unexpectedly stopped.

SUMMARY

The present disclosure provides a system and method for calculating a distance to empty (DTE) when setting a path of navigation, and more particularly, provides a method for re-calculating and displaying a DTE based on a change a path setting in navigation.

The objects of the present disclosure are not limited to the above-mentioned objects, and other objects and advantages of the present disclosure can be appreciated by the following description and will be clearly described by the exemplary embodiments of the present disclosure. In addition, it will be easily known that the objects and advantages of the present disclosure can be implemented by means shown in the appended claims and a combination thereof.

According to an exemplary embodiment of the present disclosure, a method for calculating a distance to empty (DTE) when setting a path of navigation may include: when a driving path is set using a navigation system, transmitting path search cases to a vehicle controller, determining, by the vehicle controller, whether the transmitted path search case is a case in which a path is canceled, a case in which a vehicle arrives at a destination, or a case in which the navigation system searches for the path, among the path search cases; determining whether the transmitted path search case is a case in which the path is initially set or a case in which the path is reset after initially setting of the path, among the path search cases; when the transmitted path search case is not an initial setting of the path or a path reset, among the path search cases, determining whether there is a path which is currently being guided (e.g., guidance provided along the path route); when the transmitted path search case is the case in which the path is initially set, the path reset, or the case in which the path which is currently being guided, among the path search cases, calculating a path reflected DTE using the navigation system information; and calculating path reflected prediction fuel efficiency using the path reflected DTE calculated in real time, after calculating the path reflected DTE.

The method may further include displaying a learning based DTE before setting the driving path. The learning based DTE may be calculated as a value obtained by multiplying learning fuel efficiency with current available energy. When the path search case is the case in which the path is cancelled, the case in which the vehicle arrives at the destination, or the case in which the navigation system searches for the path, among the path search cases, the vehicle controller may be configured to display the a learning based DTE through the navigation system. When the path search case is the case in which there is no the path which is currently being guided, among the path search cases, the vehicle controller may be configured to display a learning based DTE through the navigation system.

The calculation of the path reflected prediction fuel efficiency may include: calculating use prediction energy by dividing a set path of the vehicle by fuel efficiency of the set path; calculating available energy when the vehicle arrives at a set destination by subtracting the use prediction energy from current available energy of the vehicle; comparing the available energy when the vehicle arrives at the set destination with a value of 0; calculating the path reflected DTE by adding the set path of the vehicle to a remaining DTE after the vehicle arrives at the set destination; and calculating path reflected overall prediction fuel efficiency by dividing the calculated path reflected DTE by the current available energy.

In the comparison of the available energy when the vehicle arrives at the set destination with the value of 0, when the available energy when the vehicle arrives at the set destination is greater than 0, a remaining DTE after the vehicle arrives at the set destination may be calculated as a value obtained by multiplying the available energy when the vehicle arrives at the set destination with learning fuel efficiency. In addition, in the comparison of the available energy when the vehicle arrives at the set destination with the value of 0, when the available energy when the vehicle arrives at the set destination is less than 0, the controller may be configured to display a learning based DTE through the navigation system.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Advantages and features of the present disclosure and methods to achieve them will be described from exemplary embodiments described below in detail with reference to the accompanying drawings. However, the present disclosure is not limited to the exemplary embodiments set forth herein, but may also be modified in many different forms. Merely, the exemplary embodiments of the present disclosure will be provided to describe the spirit of the present disclosure in detail so that those skilled in the art may easily implement the spirit of the present disclosure.

In the drawings, the exemplary embodiments of the present disclosure are not limited to illustrated specific forms, but are exaggerated for clarity. In the present specification, specific terms have been used, but are just used for the purpose of describing the present disclosure and are not used for qualifying the meaning or limiting the scope of the present disclosure, which is disclosed in the appended claims. In the present specification, an expression 'and/or' is used as a meaning including at least one of components listed before and after the expression. In addition, an expression 'connected to/coupled to' is used as a meaning including a case in which one component is directly connected to another component or is indirectly connected through another component.

Hereinafter, exemplary embodiments of the present disclosure will be described in detail with reference to the accompanying drawings. A distance to empty (DTE) of a hybrid vehicle according to an exemplary embodiment of the present disclosure may be adjusted and calculated by a vehicle control unit (VCU). In other words, the vehicle control unit (VCU) may be configured to receive path information from a navigation system and path search cases from the navigation system, recalculate the DTE using the path information, and transmit whether to display the DTE during a reflection of a path to a display device including the navigation system or a cluster.

Figure 1:
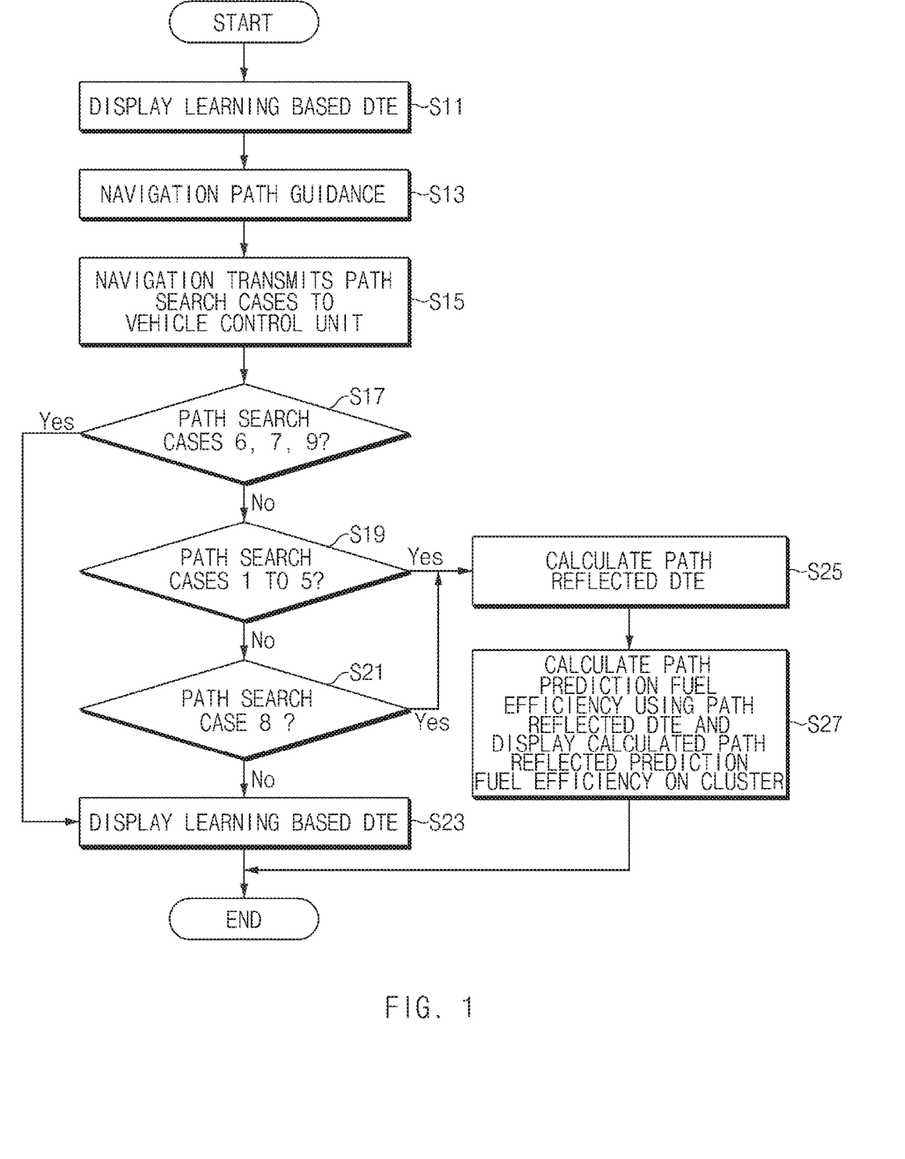
FIG. 1 is a flowchart illustrating a method for calculating a DTE when setting a path of navigation according to an exemplary embodiment of the present disclosure.

FIG. 1 is a flowchart illustrating a method for calculating a DTE when setting a path of navigation according to an exemplary embodiment of the present disclosure. Referring to FIG. 1, a vehicle may be configured to display a learning based DTE before a driving path is set through the navigation system (S11). In particular, the learning based DTE may be calculated using a stored or set method (e.g., a method for calculating a DTE considering fuel efficiency for the driving path). The learning based DTE may be calculated as a value obtained by multiplying learning fuel efficiency with current available energy.

Further, when the driving path is set through the navigation system (i.e., start, change, cancel, or the like of a guidance of the driving path), the navigation system may be configured to transmit path search cases (e.g., path information) to the vehicle control unit (VCU) (S13 to S15). Since the path search cases (e.g., path search selections) are described in detail in FIG. 4, a detailed description thereof will be omitted herein. The path search cases may be referred to as various driver selection inputs of a navigation system or path search selections. The vehicle controller (e.g., the VCU) that receives the path search cases from the navigation system may be configured to determine whether the received path search case is a case in which the path is cancelled by a user (see a path search case 6 of FIG. 4), a case in which the vehicle arrives at a destination (see a path search case 7 of FIG. 4), or a case in which the navigation system searches for the path (see a path search case 9 of FIG. 4), among the path search cases (S17).

Particularly, when the received path search case is the case in which the path is cancelled, the case in which the vehicle arrives at the destination, or the case in which the navigation system searches for the path, among the path search cases, the vehicle controller may be configured to display the learning based DTE through the navigation system. The learning based DTE may be calculated as a value obtained by multiplying learning fuel efficiency with current available energy.

However, when the vehicle controller determines that the received path search case is not the case in which the path is cancelled, the case in which the vehicle arrives at the destination, or the case in which the navigation system searches for the path, the vehicle controller may be configured to determine whether the received path search case is a case in which the path is initially set (see a path search case 1 of FIG. 4), a case in which the path is reset by the user after initially setting the path (see path search cases 2 to 4 of FIG. 4), or a case in which the navigation system autonomously re-searches for the path (see a path search case 5 of FIG. 4), among the path search cases (S19).

Figure 4:
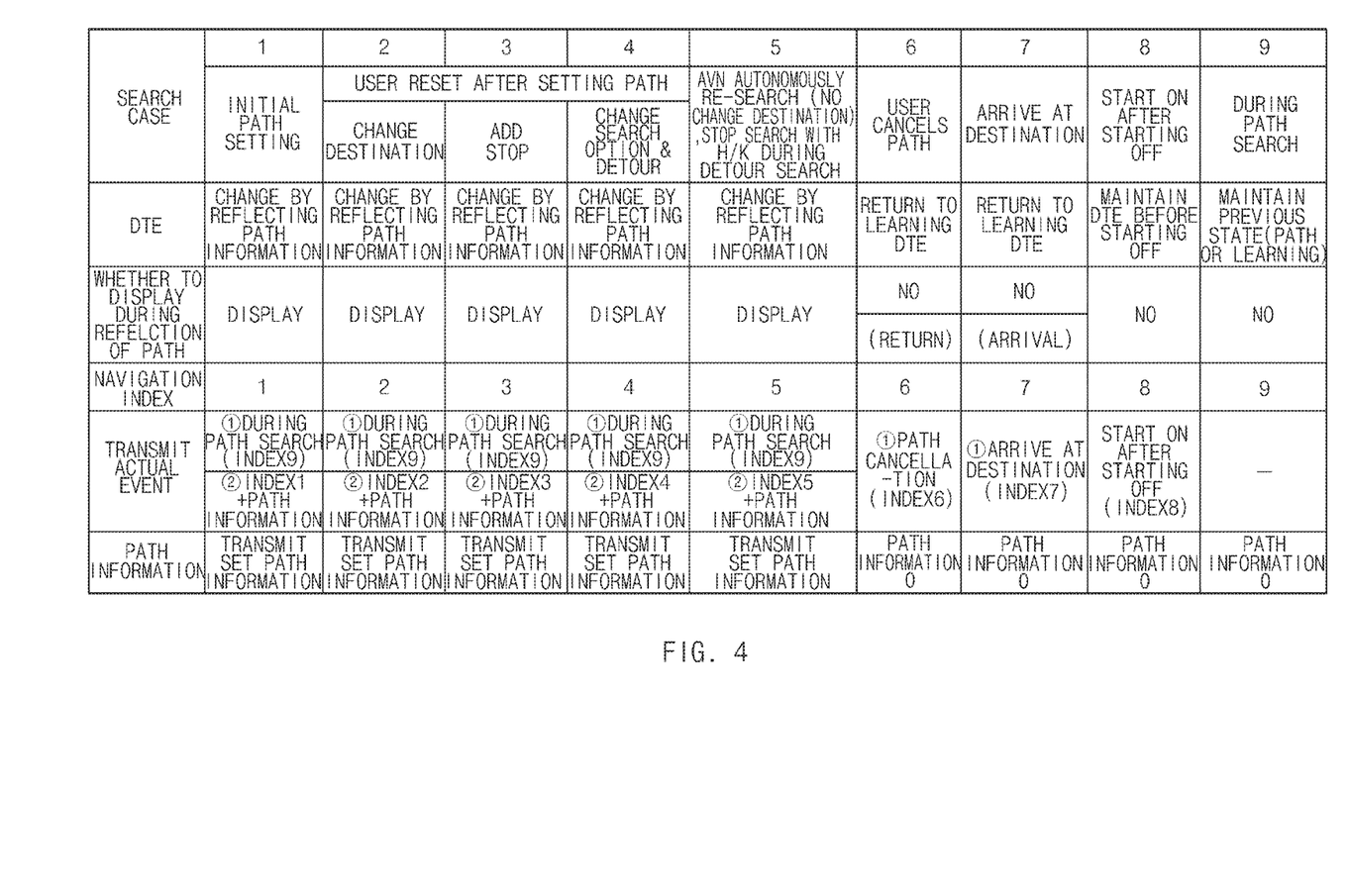
FIG. 4 is a table illustrating a method for displaying a DTE, path information, and the like according to a search method in navigation according to an exemplary embodiment of the present disclosure.

When the received path search case is not the case in which the path is initially set, is not the case in which the path is reset after initially setting the path, or is not the case in which the navigation system autonomously re-searches for the path, among the path search cases, the vehicle controller may be configured to determine whether there is a path which is currently being guided (e.g., a path towards which the navigation system is currently providing guidance to the driver) (that is, maintains the DTE before starting off in the case in which the vehicle starts immediately after a starting off of the vehicle as in a path search case 8 of FIG. 4) (S21). When the navigation system is not currently guiding the driver or vehicle towards a path, (e.g., no path is detected that is currently being guided) the vehicle controller may be configured to display the learning based DTE through the navigation system (S23).

However, in the operation (S19), when the received path search case is the case in which the path is initially set, the case in which the path is reset by the user after initially setting the path, or the case in which the navigation system autonomously re-searches for the path, among the path search cases, the vehicle controller that receives the path search cases from the navigation system may be configured to display a path reflected DTE through the navigation system, in the operation (S21), when the received path search case is detected to be the path which is currently being guided (e.g., a case in which the vehicle starts on immediately after the starting off of the vehicle), the vehicle controller may be configured to calculate the path reflected DTE using the navigation information, and the vehicle controller may be configured to calculate path reflected prediction fuel efficiency using the path reflected DTE calculated in real time after calculating the path reflected DTE through the navigation system and display the calculated path reflected prediction fuel efficiency on the cluster of the vehicle (S25 to S27).

Figure 2:
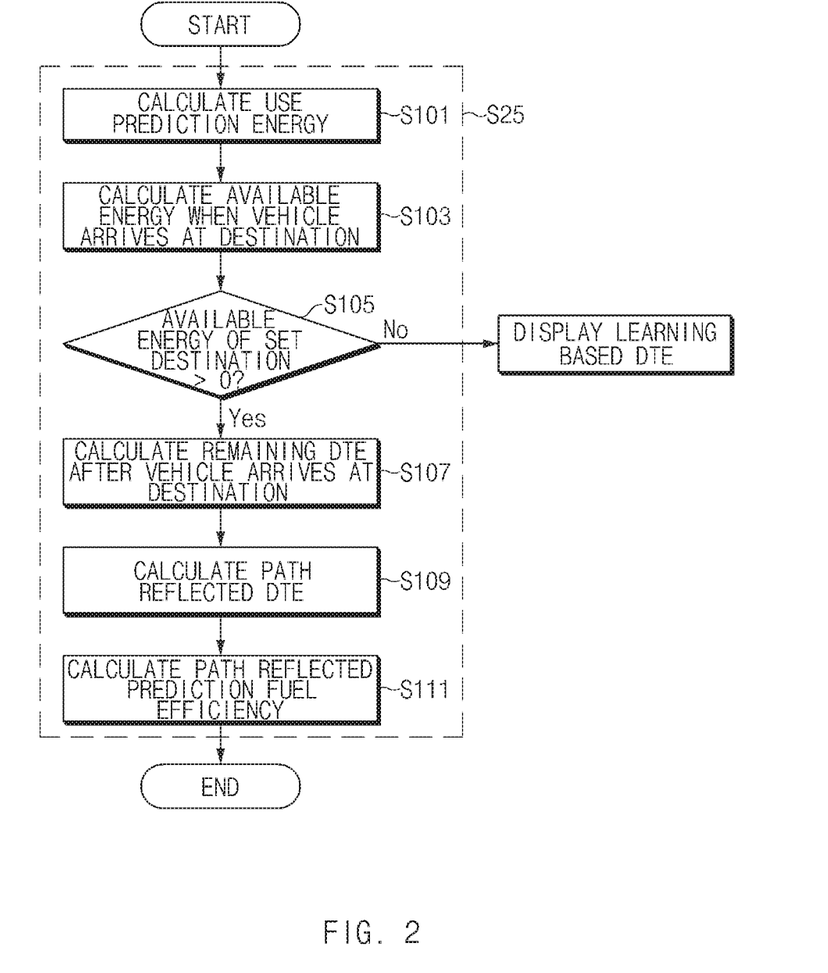
FIG. 2 is a flowchart illustrating a detailed method for calculating a path reflected DTE according to an exemplary embodiment of the present disclosure.

FIG. 2 is a flowchart illustrating a detailed method for calculating a path reflected DTE according to an exemplary embodiment of the present disclosure. Referring to FIG. 2, the vehicle controller may be configured to execute a method for calculating a path reflected DTE as described below to display the path reflected DTE on the navigation system.

First, the vehicle controller may be configured to use prediction energy by dividing a distance of a set path of the vehicle by set path fuel efficiency (S101). Additionally, the vehicle controller may be configured to calculate available energy when the vehicle arrives at a set destination by subtracting the calculated use prediction energy from current available energy of the vehicle (S103). The vehicle controller may then be configured to compare the available energy when the vehicle arrives at the set destination with a value of 0 (S105). When the available energy when the vehicle arrives at the set destination is greater than 0, a remaining DTE after the vehicle arrives at the set destination may be calculated as a value obtained by multiplying the available energy when the vehicle arrives at the set destination with learning fuel efficiency (S107).

However, when the available energy when the vehicle arrives at the set destination is less than 0, the vehicle controller may be configured to display a learning based DTE through the navigation system. Further, the vehicle controller may be configured to calculate the path reflected DTE by adding the distance of the set path to the remaining DTE after the vehicle arrives at the set destination (S109). The vehicle controller may then be configured to calculate the path reflected prediction fuel efficiency by dividing the calculated path reflected DTE by current available energy (S111).

Figure 3:
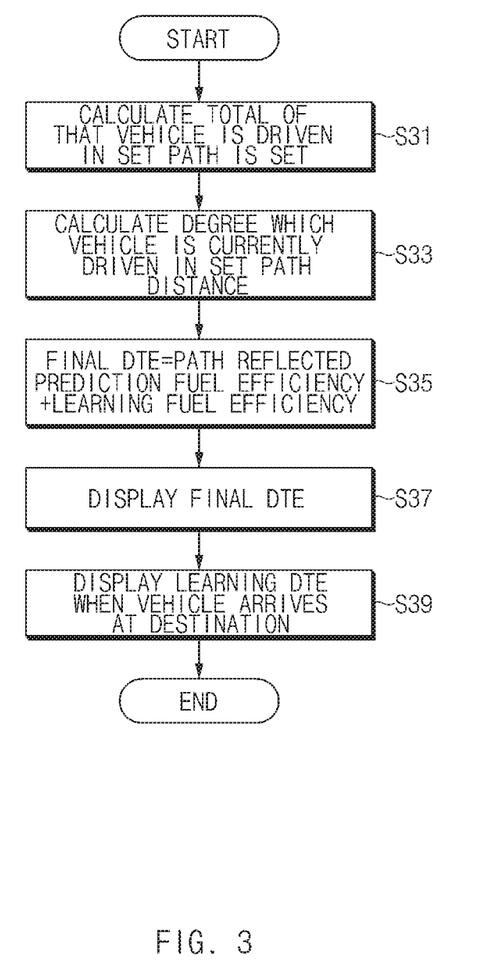
FIG. 3 is a flowchart illustrating a method for calculating a DTE of a vehicle after setting a path in navigation according to an exemplary embodiment of the present disclosure.

FIG. 3 is a flowchart illustrating a method for calculating a DTE of a vehicle after setting a path in navigation according to an exemplary embodiment of the present disclosure. Referring to FIG. 3, the navigation system may be configured to display the path reflected DTE using the path reflected prediction fuel efficiency calculated as illustrated in FIG. 1.

The vehicle controller may be configured to calculate a total of distance that the vehicle is driven based on a driving path by accumulating a distance that the vehicle is driven after the driving path is set (S31). Further, the vehicle controller may be configured to divide the total of distance that the vehicle is driven based on the driving path after the driving path is set by an entire path (e.g., the distance of the entire path). In other words, the vehicle controller may be configured to determine a distance that the vehicle has been driven on the set path based on the distance of the total driving path (S33).

Additionally, the vehicle controller may be configured to calculate a final DTE by simultaneously reflecting path reflected prediction fuel efficiency according to a path reflection ratio map and learning fuel efficiency (S35). The vehicle controller may then be configured to display the final DTE on the navigation system (S37). When the vehicle arrives at the destination, the vehicle controller may be configured to display the learning DTE through the navigation system (S39).

Particularly, the path reflected prediction fuel efficiency may be reflected at 100% in an initial path setting, and the controller may be configured to calculate and display the DTE by the multiplication with the available energy, and as the vehicle progresses along a path driving, importance of the path reflected prediction fuel efficiency is decreased and a reflection importance of the learning fuel efficiency is increased according to the path reflection ratio map, and thus, the learning fuel efficiency may be reflected at 100% (e.g., may be fully reflected) before the vehicle arrives at the destination, thereby making it possible to allow the vehicle to be returned to the learning based DTE when the vehicle arrives at the destination to prevent a rapid change of the DTE of the vehicle.

FIG. 4 is a table illustrating a method for displaying a DTE, path information, and the like according to a search method in navigation according to an exemplary embodiment of the present disclosure. Referring to FIG. 4, a user or a driver may select a search type of navigation system in a vehicle.

The search type of navigation may include a case in which the user or the driver initially sets a path, a case in which the user or the driver resets a destination after initially setting the path, a case in which the navigation system autonomously re-searches for the path, a case in which the user or the driver cancels the path, a case in which the vehicle arrives at the destination, a case in which the vehicle starts on after starting off, and a state in which the path is being searched. In other words, the vehicle controller may be configured to change the DTE according to the search type of navigation, display whether the path is reflected, and display a navigation index, and the navigation system may be configured to transmit an actual event to the vehicle controller and transmit path information to the VCU. In other words, the navigation system may be configured to transmit a current state (e.g., actual event) of the vehicle, such as, whether the vehicle has arrived at the destination, whether a path is set, etc.

First, when the user or the driver initially sets the path, the vehicle controller may be configured to change the DTE by reflecting set path information, display whether the path is reflected, and display the navigation index as '1', and the navigation system may be configured to transmit the actual event to the vehicle controller and transmit the set path information to the VCU (e.g., the controller may be configured to receive information from the navigation system). When the user or the driver resets the destination after initially setting the path (e.g., when the destination is changed, a stop is added, or a search option is changed), the vehicle controller may be configured to change the DTE by reflecting the set path information, display whether the path is reflected, and display the navigation index as '2' to '4', and the navigation system may be configured to transmit the actual event to the vehicle controller and transmit the set path information to the VCU. The various navigation indices may correspond to the path search cases described herein above.

Further, when the user or the driver does not change the destination (e.g., when the navigation autonomously re-searches), the vehicle controller may be configured to change the DTE by reflecting the set path information, display whether the path is reflected, and display the navigation index as '5', and the navigation system may be configured to transmit the actual event to the vehicle controller and transmit the set path information to the VCU. When the user or the driver cancels the path, the vehicle controller may be configured to change the DTE into the learning DTE, may not be configured to display whether the path is reflected, and may be configured to display the navigation index as '6', and the navigation system may be configured to transmit a path cancellation event to the vehicle controller and prevent transmission of the path information to the vehicle controller since there is no set path information.

When the vehicle arrives at the destination, the vehicle controller may be configured to change the DTE into the learning DTE, may not be configured to display whether the path is reflected, and may be configured to display the navigation index as '7', and the navigation system may be configured to transmit a destination arrival event to the vehicle controller and prevent transmission of the path information to the vehicle controller since there is no set path information. When the vehicle starts on after starting off, the vehicle controller may be configured to change the DTE into a DTE before the starting off, may be configured to not display whether the path is reflected, and may be configured to display the navigation index as '8', and the navigation system may be configured to transmit an event that the vehicle starts on after the starting off to the vehicle controller and prevent transmission of the path information to the vehicle controller since there is no set path information. Lastly, when the path of the vehicle is being searched, the vehicle controller may be configured to change the DTE by reflecting the set path information or change the DTE into the learning DTE, may be configured to not display whether the path is reflected, and may be configured to display the navigation index as '9', and the navigation may be configured to prevent transmission of the path information to the vehicle controller since there is no set path information.

As described above, according to the exemplary embodiments of the present disclosure, the present technology may prevent a phenomenon in which the DTE is rapidly changed according to the path change in the navigation. Further, the present technology may consider the fuel efficiency according to the driving of the vehicle after the vehicle arrives at the destination according to the path in the navigation system. Further, the present technology may calculate the remaining DTE after the vehicle arrives at the destination according to the path in the navigation.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for calculating a distance to empty (DTE) when setting a path of navigation, comprising:
   when a driving path is set through a navigation system, receiving, by a vehicle controller, path search cases from the navigation system;
   determining, by the vehicle controller, whether the path search case is a case in which a path is cancelled by a user, a case in which a vehicle arrives at a destination, or a case in which the navigation system searches for the path, among the path search cases;
   determining, by the vehicle controller, whether the path search case is a case in which the path is initially set or a case in which the path is reset by the user after initially setting the path, among the path search cases;
   when the path search case is not the case in which the path is initially set or is not the case in which the path is reset after initially setting the path, among the path search cases, determining, by the vehicle controller, whether there is a currently guided path;
   when the path search case is the case in which the path is initially set, the case in which the path is reset after initially setting the path, or the case in which there is the currently guided path, among the path search cases, calculating, by the vehicle controller, a path reflected DTE through the navigation system; and calculating, by the vehicle controller, path reflected prediction fuel efficiency using the path reflected DTE calculated in real time, after calculating the path reflected DTE,
wherein the path reflected DTE before the vehicle arrives at the destination is calculated by controlling a reflection ratio of the path reflected prediction fuel efficiency and a learning fuel efficiency as the vehicle drives along the path.

2. The method according to claim 1, further comprising:
displaying, by the vehicle controller, a learning based DTE before setting the driving path through the navigation system.

3. The method according to claim 2, wherein the learning based DTE is calculated as a value obtained by multiplying learning fuel efficiency with current available energy.

4. The method according to claim 1, further comprising:
displaying, by the vehicle controller, a learning based DTE through the navigation system when the path search case is the case in which the path is cancelled by the user, the case in which the vehicle arrives at the destination, or the case in which the navigation system searches for the path, among the path search.

5. The method according to claim 1, further comprising:
displaying, by the vehicle controller, a learning based DTE through the navigation system when the path search case is the case in which there is no currently guided path, among the path search cases.

6. The method according to claim 1, wherein the calculating of the path reflected prediction fuel efficiency includes:
calculating, by the vehicle controller, use prediction energy by dividing a set path of the vehicle by fuel efficiency of the set path;
calculating, by the vehicle controller, available energy when the vehicle arrives at a set destination by subtracting the use prediction energy from current available energy of the vehicle;
comparing, by the vehicle controller, the available energy when the vehicle arrives at the set destination with a value of 0;
calculating, by the vehicle controller, the path reflected DTE by adding the set path of the vehicle to a remaining DTE after the vehicle arrives at the set destination; and
calculating, by the vehicle controller, path reflected overall prediction fuel efficiency by dividing the calculated path reflected DTE by the current available energy.

7. The method according to claim 6, wherein in the comparing of the available energy when the vehicle arrives at the set destination with the value of 0, when the available energy when the vehicle arrives at the set destination is greater than 0, a remaining DTE after the vehicle arrives at the set destination is calculated as a value obtained by multiplying the available energy when the vehicle arrives at the set destination with learning fuel efficiency.

8. The method according to claim 6, wherein in the comparing of the available energy when the vehicle arrives at the set destination with the value of 0, when the available energy when the vehicle arrives at the set destination is less than 0, a learning based DTE is displayed through the navigation system.

9. A system for calculating a distance to empty (DTE) when setting a path of navigation, comprising:
a navigation system configured to determine whether a driving path is set; and
a controller configured to:

receive path search cases from the navigation system;
determine whether the path search case is a case in which a path is cancelled by a user, a case in which a vehicle arrives at a destination, or a case in which the navigation system searches for the path, among the path search cases;
determine whether the path search case is a case in which the path is initially set or a case in which the path is reset by the user after initially setting the path, among the path search cases;
when the path search case is not the case in which the path is initially set or is not the case in which the path is reset after initially setting the path, among the path search cases determine whether there is a currently guided path;
when the path search case is the case in which the path is initially set, the case in which the path is reset after initially setting the path, or the case in which there is the currently guided path, among the path search cases calculate a path reflected DTE through the navigation system; and
calculate path reflected prediction fuel efficiency using the path reflected DTE calculated in real time, after calculating the path reflected DTE,
wherein the path reflected DTE before the vehicle arrives at the destination is calculated by controlling a reflection ratio of the path reflected prediction fuel efficiency and a learning fuel efficiency as the vehicle drives along the path.

10. The system of claim 9, wherein the controller is further configured to:
display a learning based DTE before setting the driving path through the navigation system.

11. The system of claim 10, wherein the learning based DTE is calculated as a value obtained by multiplying learning fuel efficiency with current available energy.

12. The system of claim 9, wherein the controller is further configured to:
display a learning based DTE through the navigation system when the path search case is the case in which the path is cancelled by the user, the case in which the vehicle arrives at the destination, or the case in which the navigation system searches for the path, among the path search.

13. The system of claim 9, wherein the controller is further configured to:
display a learning based DTE through the navigation system when the path search case is the case in which there is no currently guided path, among the path search cases.

14. The system of claim 9, wherein the controller is further configured to:
calculate use prediction energy by dividing a set path of the vehicle by fuel efficiency of the set path;
calculate available energy when the vehicle arrives at a set destination by subtracting the use prediction energy from current available energy of the vehicle;
compare, the available energy when the vehicle arrives at the set destination with a value of 0;
calculate the path reflected DTE by adding the set path of the vehicle to a remaining DTE after the vehicle arrives at the set destination; and
calculate path reflected overall prediction fuel efficiency by dividing the calculated path reflected DTE by the current available energy.

15. The system of claim 14, wherein in the comparison of the available energy when the vehicle arrives at the set destination with the value of 0, when the available energy when the vehicle arrives at the set destination is greater than 0, a remaining DTE after the vehicle arrives at the set destination is calculated as a value obtained by multiplying the available energy when the vehicle arrives at the set destination with learning fuel efficiency.

16. The system of claim 14, wherein in the comparison of the available energy when the vehicle arrives at the set destination with the value of 0, when the available energy when the vehicle arrives at the set destination is less than 0, the navigation system is configured to display a learning based DTE.

* * * * *